INVENTOR.
Olav Moklebust

United States Patent Office 3,529,931
Patented Sept. 22, 1970

1

3,529,931
REGENERATING HCl FROM IRON CHLORIDE SOLUTIONS
Olav Moklebust, Belle Mead, N.J., assignor to National Lead Company, New York, N.Y., a corporation of New Jersey
Filed July 12, 1968, Ser. No. 744,438
Int. Cl. C01b 7/08; C01g 23/04
U.S. Cl. 23—154
4 Claims

ABSTRACT OF THE DISCLOSURE

The disclosure is of an improved process for regenerating HCl from aqueous iron chloride solutions derived from such processes as leaching metallized titaniferous ores, pickling steel or the like wherein the iron values are dissolved in an aqueous solution of HCl and iron chloride. The resulting iron chloride filtrate is divided into two portions in such a manner that one portion contains the same amount of iron chloride as was present in the original HCl-iron chloride solution. This portion is sent, as liquid, to an absorber. The other portion of the filtrate is roasted to recover the iron values as solid particulate $Fe_2O_3$ and the chlorine as gaseous HCl which is sent to the absorber where it is contacted by the aforesaid liquid one-portion and condensed to form a condensate comprising an aqueous HCl-iron chloride solution which is recycled to dissolve additional iron values.

Thus a large proportion of the water present in the iron chloride filtrate is used in the absorber for condensing the gaseous HCl and a correspondingly less amount of water goes into the roaster; since the heat requirements for the roaster are directly proportional to the volume of liquid being roasted sending smaller amounts of water to the roaster reduces heating costs. In addition since the capacity of the roaster is dependent upon the volume of liquid to be roasted, a decrease of the required amount of liquid to be roasted will require a correspondingly smaller roaster—or an existing roaster will have a correspondingly higher capacity.

Moreover with increasing concentrations of iron chloride in the original HCl-iron chloride solution correspondingly smaller amounts of water will be required to be evaporated in the roaster per ton of HCl produced thereby contributing to the savings in heating and capital costs.

BACKGROUND OF THE INVENTION

The invention would appear to be classifiable as Class 23 Chemistry and Subclasses relating to hydrogen chloride.

Probably one of the best known processes for regenerating HCl from aqueous iron chloride solutions is the so-called Dravo process. According to the Dravo process steel is pickled with a solution of about 20% HCl which reacts with the iron oxide to produce $FeCl_2$. The usual pickle liquor is desirable for a fast pickling rate and is preferred in commercial pickling operations for reasons of economy. This pickle liquor is pumped, from tanks where it is stored at about 150° F., to a spray roaster where the $FeCl_2$ is decomposed and oxidized according to the equation:

$$2FeCl_2 + 2H_2O + \tfrac{1}{2}O_2 > Fe_2O_3 + 4HCl$$

This reaction is exothermic, the heat generated being about 98.9 cal./4 mol. HCl at 20° C. However due to the large amount of $H_2O$ that must also be evaporated, a relatively large amount of additional heat must be supplied—an amount that is almost proportional to the total volume of liquid being evaporated. About 95% of the $Fe_2O_3$ formed is deposited in the bottom of the roaster from which it is recovered by way of a star-valve or the like. The gases i.e. gaseous HCl and water vapor are sent to a cyclone or equivalent separator where any remaining $Fe_2O_3$ is recovered; and from thence to an absorber where substantially all of the gaseous HCl is absorbed as 20% acid (at 200° F.) by a cold water spray. This condensate is sent to storage from which it is pumped back to the steel pickling plant as needed, where it is supplemented by a small amount of fresh, concentrated HCl to compensate for losses.

Although the Dravo process is widely used it is relatively costly for two reasons namely: (1) the large amount of fuel required in the roasting step and (2) the size of the equipment required—both of which are dictated by the relatively large volume of water (75%) in the chloride solution.

It has been proposed to reduce this cost by evaporating the water from the pickle liquor at a lower temperature prior to roasting. However this expedient has not been wholly satisfactory both from the standpoint of cost and general application.

SUMMARY OF THE INVENTION

The present invention is the discovery of an improved process for regenerating HCl from aqueous iron chloride solutions which overcomes the disadvantages of prior art methods, and effects a highly superior economy of operation, the method of this invention being characterized by using an aqueous solution of HCl plus iron chloride, in lieu of the aqueous HCl solutions of the prior art, to dissolve the iron values from whatever the source, i.e. metallized titaniferous ores, steel pickling processes, and the like. The resulting iron chloride solution sometimes referred to as leach liquor or pickle liquor as the case may be, is divided into two portions in a manner such that one portion contains the same amount of iron chloride as was present in the original HCl-iron chloride solution. This one-portion is sent to an absorber. The other portion of the iron chloride solution is sent to the roaster where it is roasted to recover the iron values as solid particulate $Fe_2O_3$, the chlorine values as gaseous HCl and the water as water vapor. The gaseous HCl and water vapor may be sent first to a cyclone separator or its equivalent to remove any traces of solid $Fe_2O_3$, and from thence to the absorber where the gases are brought into contact with the aforesaid one-portion of liquid and iron chloride solution which condenses the gases and forms a condensate comprising HCl, iron chloride and water in amounts corresponding respectively to those of the original HCl-iron chloride solution. As a consequence the condensate may be recycled to dissolve additional iron values. Moreover it has been discovered that with increasing concentrations of iron chloride in the HCl-iron chloride solution proportionately lesser amounts of $H_2O$ will be present in that portion of the iron chloride solution sent to the roaster and hence it is desirable to operate with HCl-iron chloride solutions of relatively high iron chloride concentrations.

DESCRIPTION OF THE PREFERRED EMBODIMENT

The invention contemplates the regeneration of HCl from aqueous iron chloride solutions derived from such sources as steel pickling processes and processes for leaching titaniferous materials as for example, ilmenite ores such as Florida beach sands, MacIntyre ore, (a massive ilmenite ore obtained from the MacIntyre mines at Tahawus, N.Y.), low temperature $TiO_2$ slags and the like. While the ilmenite ores may be leached without prior reduction of the iron values the leaching time will be relatively long and hence it is preferred in the interest of economy, to reduce or metallize the ilmenite prior to leaching.

The term aqueous iron chloride solution as used herein and in the claims will be understood to include pickle liquors and leach liquors obtained from the above mentioned sources.

While it has been the practice in the past to dissolve the iron values from a metallized ilmenite ore by leaching with an aqueous solution of say 10% HCl; stronger solutions tend to react violently and may also dissolve $TiO_2$—which is not desired; or to pickle steel with a 20% HCl solution the present invention is characterized by using an aqueous HCl solution containing iron chloride. Moreover as pointed out above the higher the concentration of iron chloride in the HCl solution the lower will be the amount of water in that portion of the iron chloride solution sent to the roaster.

Figure 1:
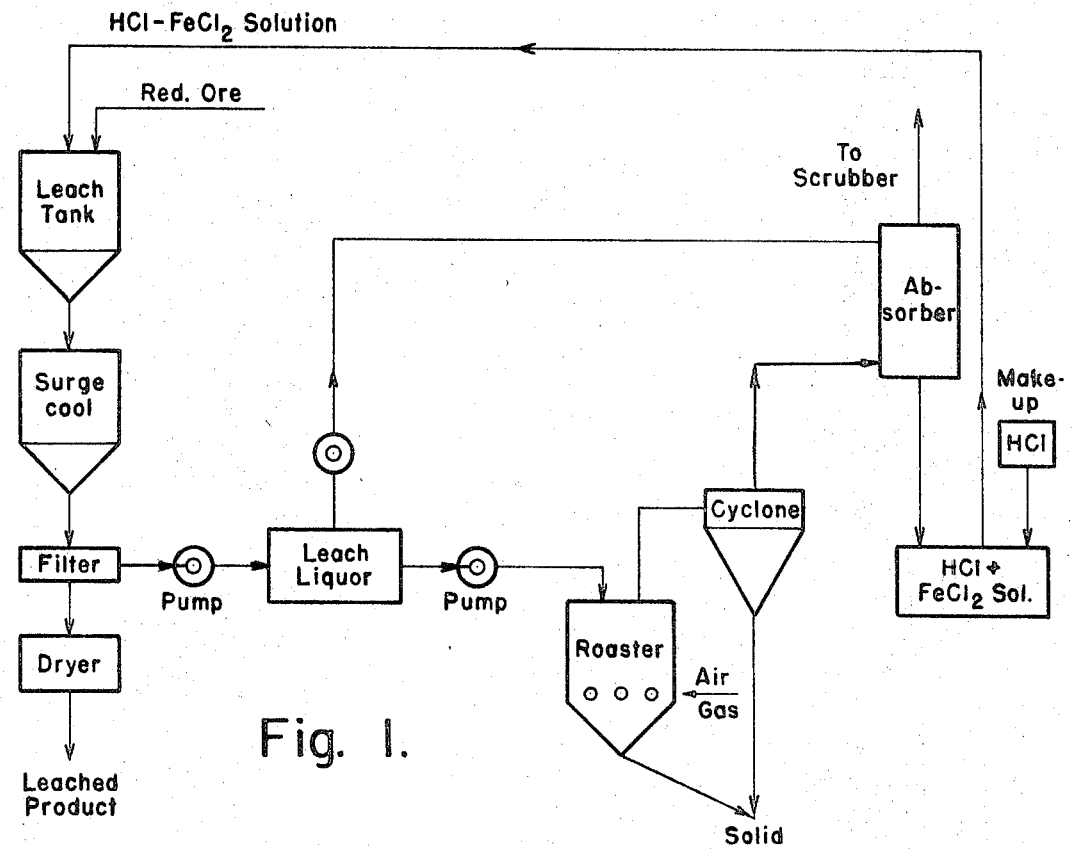
FIG. 1 is a flow diagram of the process of this invention for regenerating HCl from an aqueous iron chloride solution.
Figure 2:
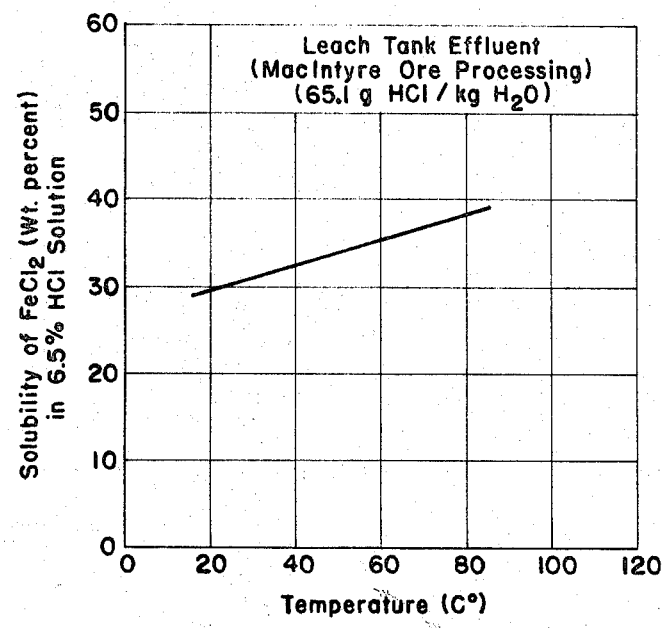
FIG. 2 shows graphically the solubility of $FeCl_2$ at different temperatures in an aqueous iron chloride solution containing 6.0% free HCl.

In this connection the solubility of iron chloride in a solution of HCl will depend of course upon the concentration of HCl and the temperature of the solution and as shown graphically in FIG. 2 this is essentially a straight line relationship. For most processes wherein a metallized titaniferous ore is leached with an aqueous solution of HCl the acid concentration is from about 7% to about 10% and the temperature of the solution is from about 20° C. to 70° C. under which conditions the solubility of iron chloride may vary from 28% to as high as 37% on a weight basis.

In a steel pickling process optimum operating conditions are insured by using HCl solutions of relatively high acid concentration i.e. 18–20% and temperatures of about 50° C. The resulting liquor contains about 14% $FeCl_2$, 10–11% unreacted HCl and water. The amount of unreacted liquor is determined by the desired pickling rate. This liquor is then roasted.

Variations of leaching rates or pickling rates, acid concentrations, temperatures and iron chloride solubilities may be expected depending upon the source of the iron values but such variations are within the purview of one skilled in the art and are contemplated within the scope of the present invention.

The aqueous iron chloride solutions derived from either of these sources will comprise iron chloride ($FeCl_2$) some free HCl and water. As shown in the flow diagram this solution is divided into two portions, the division being made on the basis of providing one portion with an amount of iron chloride equal to that present in the HCl-iron chloride solution used in dissolving the iron values present in the metallized ore or steel as the case may be. This one-portion is sent to an absorber. The other portion of said iron chloride solution is sent to the roaster where it is roasted at a temperature in the range of 750° F. to 850° F. whereby the iron chloride values are converted to solid particulate iron oxide ($Fe_2O_3$), gaseous HCl and water vapor. These gases are sent to a cyclone or equivalent separator means where any residual solid iron oxide is removed after which the gases are sent on to the absorber where they are contacted by the aforesaid one-portion of iron chloride solution and condensed to form a condensate comprising HCl, iron chloride and water, the composition of which will correspond substantially to that of the original HCl-iron chloride solution. As such it is adapted to be recycled to dissolve additional iron values.

Thus in its preferred embodiment the invention contemplates a cyclic process wherein the condensate from the absorber is recycled to the pickling or leaching process, as the case may be, fresh HCl being added to the condensate to make up for any HCl losses in the system, before it is used for renewed pickling or leaching.

As mentioned above a significant aspect of the invention is the concept of utilizing iron chloride in the aqueous HCl solution used to dissolve the iron values; and more especially the discovery that the higher the iron chloride concentration the smaller will be the amount of water in the solution sent to the absorber—for the reason as the iron chloride concentration is increased the ratio of water to iron chloride in the HCl-iron chloride solution is decreased and when divided to send the one-portion to the absorber the ratio of water to iron chloride in the solution sent to the roaster is again reduced.

Thus as shown below an aqueous HCl solution comprising 21% $FeCl_2$ (Example I) would, when divided in the manner aforesaid send 1350 kg. of water to the roaster whereas if the concentration of $FeCl_2$ is increased to 32% (Example III) the amount of water sent to the roaster is decreased to 675 kg. or approximately half the previous amount thereby effecting a significant reduction in the amount of heat required to volatilize the iron-chloride solution. In this connection FIG. 2 of the drawing shows graphically the solubility of $FeCl_2$ in an aqueous iron chloride solution containing 6% HCl. It will be seen that a straight line relationship exists between solubility and temperature and that within the temperature range of 20° C. to 85° C. the solubility of $FeCl_2$ varies from about 28% to 38% on a weight percent basis. Inasmuch as the industrial processes for leaching metallized ores or pickling steel are carried out successfully within a temperature range which embraces relatively high solubilities of iron chloride in aqueous HCl solutions the regeneration of HCl from these solutions can be effected in unexpectedly high savings in operating costs.

The following examples will serve to further illustrate the invention.

EXAMPLE I

Starting with a Florida ilmenite ore which had been reduced to convert the iron values to metallic iron by techniques well known in the art, 1000 kg. of this reduced ore, comprising about 280 kg. metallic iron and about 720 kg. $TiO_2$ plus miscellaneous gangue, were leached with an aqueous HCl-iron chloride solution comprising 360 kg. HCl at 7.4%, 1000 kg. $FeCl_2$ and 3500 kgs. water the concentration of $FeCl_2$ being about 21.0%. Leaching was carried out for about 1 hour at a temperature of about 60° C. Following leaching the mass was cooled and then filtered to separate and remove the leached solids i.e. a $TiO_2$ concentrate from the residual iron chloride solution which analyzed 1630 kg. $FeCl_2$ and 3500 kg. water the concentration of $FeCl_2$ being about 32%. The iron chloride solution was then divided into two portions such that one portion contained 1000 kg. $FeCl_2$, corresponding to the amount of $FeCl_2$ in the original HCl-iron chloride solution, and 2150 kg. water the total amount of iron chloride solution being 3150 kg. This portion was sent to an absorber. The remaining portion of the iron chloride solution comprising 630 kg. $FeCl_2$ and 1350 kg. $H_2O$ was sent to a roaster where it was heated to 400° C. to convert substantially all of the solution to solid particulate $Fe_2O_3$, gaseous HCl and water vapor. About 360 kg. of $Fe_2O_3$ were recovered from the roaster. The gaseous HCl and water vapor were sent to a cyclone where an additional 40 kg. of $Fe_2O_3$ were recovered and from thence to the absorber where the gases were contacted, cooled and condensed using the first portion of iron chloride solution in lieu of water. The condensate recovered from the absorber comprised about 350 kg. HCl, about 1000 kg. FeCl$_2$ and 3500 kg. water or a total of 4860 kgs. and was recycled to leach additional metallized ore.

EXAMPLE II

A second experiment was performed to illustrate the economies affected by the process of this invention over the methods of the prior art. The metallized ore was the same as that used in Example I. However the metallized ore was leached with an aqueous solution of HCl comprising about 360 kg. HCl at 9.5% and 3500 kg. water. No iron chloride was used in this solution. The iron chloride leach solution comprised 630 kg. iron chloride and 3500 kg. water and was sent directly to the roaster where the total amount of solution i.e. 4130 kg. was roasted to recover the iron values as Fe$_2$O$_3$ and the chlorine values as gaseous HCl. The latter plus water vapor was then condensed in an absorber using water as the coolant.

EXAMPLE III

Another run was made again using the metallized ore of Example I but in this instance the ore was leached with an aqueous HCl-iron chloride solution comprising 360 kg. HCl, 1000 kg. FeCl$_2$ and 1750 kg. water. The HCl was about 11.6% and the concentration of FeCl$_2$ in the solution was about 32.0%. After leaching 1000 kg. of the metallized ore, as was done in Example I, the mass was filtered to recover the TiO$_2$ concentrate and an iron chloride filtrate comprising 1630 kg. FeCl$_2$ and 1750 kg. water. This was divided into two portions such that one portion contained 1000 kg. iron chloride. On the basis of the iron concentration of the solution the amount of water in this portion was only 1075 kg. Moreover the amount of water in the other portion of the solution sent to the roaster was only 675 kg. Both portions were processed as described in Example I to regenerate the HCl and produce a condensate similar in composition to the original aqueous HCl-iron chloride solution.

EXAMPLE IV

Another run was made using 1000 kg. of a metallized MacIntyre ore which after metallization comprised 350 kg. metallic iron and 650 kg. TiO$_2$ plus gangue. This metallized ore was leached with an aqueous HCl-iron chloride solution comprising 450 kg. HCl, 1000 kg. FeCl$_2$ and 3500 kg. H$_2$O. The HCl was at an acid strength of about 9.2% and the concentration of iron chloride was about 20%.

Leaching was carried out for 1½ hours at 70° C. after which the TiO$_2$ concentrate was separated and removed by filtration. The residual iron chloride solution comprised 1790 kg. iron chloride and 3500 kg. water and was divided into two portions. The portion sent to the absorber comprised 1000 kg. FeCl$_2$ and 1955 kg. water while the portion sent to the roaster comprised 790 kg. iron chloride and 1545 kg. water or a total of 2,335 kg. Both portions were processed as described in Example I above to recover the condensate having substantially the compositions of the original HCl-iron chloride solution.

EXAMPLE V

As indicated above the invention is also applicable to processes for pickling steel to remove the iron oxide scale therefrom. Normally these pickling solutions comprises an aqueous solution of HCl after which being used to dissolve the iron values from the steel is sent, in toto, to a roaster where the iron values are recovered as solid particulate Fe$_2$O$_3$ and the chlorine values regenerated as HCl. However, pursuant to the present invention 1000 kgs. pickle liquor were prepared comprising 20% HCl, 17.5% FeCl$_2$ and 62.5% water. After being used the solution analyzed 10% HCl, 35% FeCl$_2$ and 55% H$_2$O. This solution was divided into two portions such that one portion would contain the same amount of iron chloride as in the original pickle liquor—the compositions of this portion being 50 kg. HCl, 175 kg. FeCl$_2$ and 275 kg. H$_2$O. This portion was sent to the absorber and the remaining portion comprising 50 kg. HCl, 175 kg. FeCl$_2$ and 275 kg. H$_2$O was sent to the roaster. Following the same processing steps set out in Example I the chlorine values were regenerated as HCl in a condensate having substantially the same composition as the original pickle liquor.

In the foregoing and preceding examples the addition of a small amount of make-up HCl to the concentrate was required to compensate for losses in the system.

As will be seen from each of the examples (except the control-Example II) the process of this invention effects the regeneration of the chlorine values in an iron chloride leach or pickle liquor in a manner such that a comparatively small volume of liquor need be roasted. The reduction in the amount of liquor to be roasted may vary from 10 to 60% less than the amount of liquor roasted by processes of the prior art and in as much as heat requirement for roasting are for all practical purposes directly proportioned to the volume of roaster solution very substantial savings in heat costs are guaranteed. Moreover these savings may be added to the lower capital equipment costs due to the fact that smaller roasters may be used to handle comparable amounts of iron chloride solution or correspondingly higher capacities will be attained in existing roaster equipment.

While this invention has been described and illustrated by the examples shown, it is not intended to be strictly limited thereto, and other variations and modifications may be employed within the scope of the following claims.

I claim:

1. A cyclic process for the decomposition of a titaniferous iron ore comprising the steps of:
   (1) reducing iron values in said ore to produce an ore comprising a titanium concentrate, gangue and metallic iron;
   (2) leaching said reduced ore at a temperature of from about 20° C.–85° C., without dissolving any titanium dioxide, with an aqueous solution comprising hydrochloric acid and having a substantial ferrous chloride content, said solution having a hydrochloric acid concentration of from about 7% to about 20% and from 17% to 32% by weight ferrous chloride and being derived from pickle or leach liquors;
   (3) cooling the leached mixture, and thereafter filtering to separate and remove the leached solids comprising the titanium dioxide concentrate, leaving an aqueous solution enriched with ferrous chloride content, said concentration of the ferrous chloride being from 28% to 38% by weight;
   (4) dividing the enriched aqueous filtrate solution of ferrous chloride into two portions such that one portion is substantially larger than the other in volume and contains substantially the same amount of ferrous chloride as present in the original aqueous hydrochloric acid-ferrous chloride solution employed in step (2) and sending said portion of filtrate to an absorber;
   (5) roasting the other portion of said aqueous filtrate solution of ferrous chloride to a temperature of 750° F.–850° F. to convert the iron values to solid particulate ferric oxide and to produce a gaseous mixture of hydrogen chloride and water vapor, and separating the solid ferric oxide from the said gaseous mixture;
   (6) passing the said gaseous mixture of hydrogen chloride and water vapor to said absorber wherein they are contacted with the aforementioned portion of aqueous ferrous chloride solution and condensed to form a condensate comprising an aqueous solution of hydrochloric acid and ferrous chloride, the composition of which corresponds substantially to that of the original aqueous solution containing hydrochloric acid and ferrous chloride;

(7) recycling said aqueous solution of hydrochloric acid and ferrous chloride to step (2) for leaching additional reduced titaniferous iron ore.

2. In a process for the decomposition of titaniferous iron ores according to claim 1 wherein the titaniferous iron ore is Quilon ore and the aqueous HCl-iron chloride solution comprises up to 20% HCl and up to 30% $FeCl_2$ by weight of solution.

3. In a process for the decomposition of titaniferous ores according to claim 1 wherein the titaniferous iron ore is MacIntyre ore and the aqueous HCl-iron chloride solution comprises up to 20% of HCl and up to 30% $FeCl_2$ by weight of solution.

4. In a process for the decomposition of titaniferous ores according to claim 1 wherein the aqueous HCl-iron chloride solution comprises about 20% HCl and about 17.5% $FeCl_2$ by weight of solution.

References Cited
UNITED STATES PATENTS

| | | | |
|---|---|---|---|
| 3,076,692 | 2/1963 | Ruter et al. | 23—202 |
| 3,310,435 | 3/1967 | Robinson et al. | 23—154 XR |
| 3,399,964 | 9/1968 | Michels et al. | 23—154 |
| 3,407,033 | 10/1968 | Ruter et al. | 23—202 XR |
| 3,440,009 | 4/1969 | Flood et al. | 23—154 |
| 3,442,608 | 5/1969 | Addinall et al. | 23—154 |
| 3,443,991 | 5/1969 | Kremm | 23—154 XR |
| 3,446,590 | 5/1969 | Michel et al. | 23—202 |
| 3,457,037 | 7/1969 | Aramendia et al. | 23—202 |

EDWARD STERN, Primary Examiner

U.S. Cl. X.R.

23—87, 200, 202; 75—1, 101